Oct. 10, 1961     D. A. MATARAZZO     3,003,466
AUTOMOBILE PET HOLDING DEVICE
Filed Jan. 6, 1960
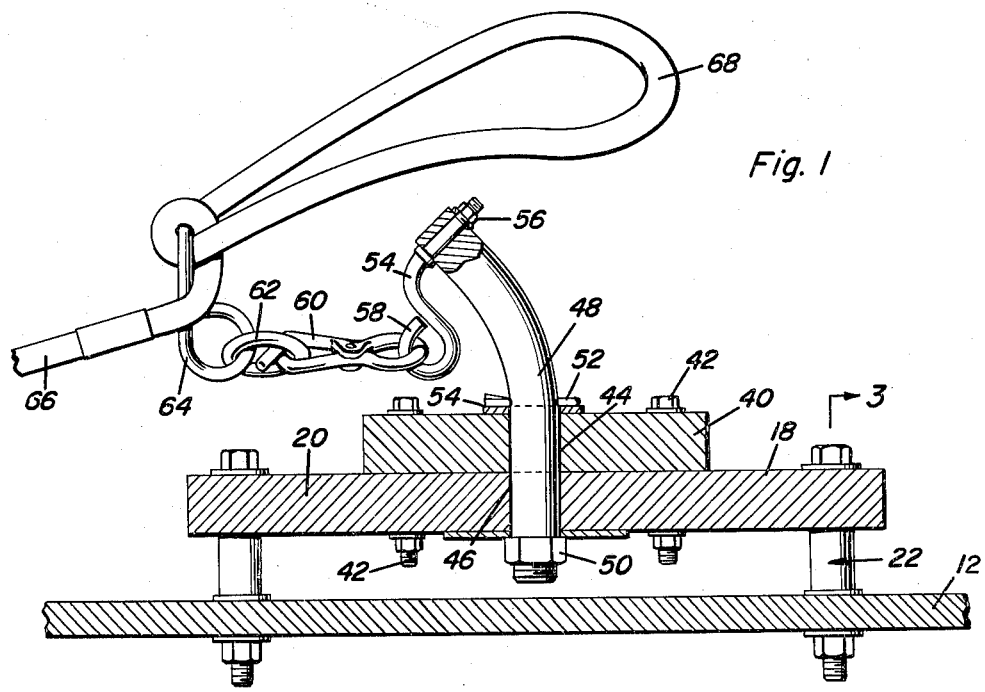
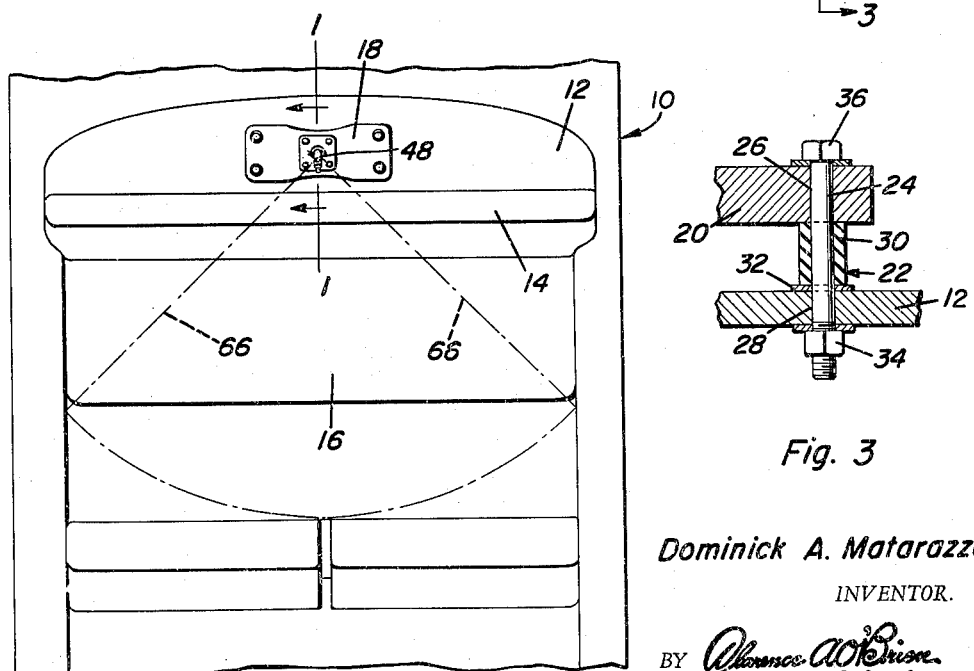
Dominick A. Matarazzo
INVENTOR.

United States Patent Office 3,003,466
Patented Oct. 10, 1961

3,003,466
AUTOMOBILE PET HOLDING DEVICE
Dominick A. Matarazzo, 7810 5th Ave.,
North Bergen, N.J.
Filed Jan. 6, 1960, Ser. No. 724
4 Claims. (Cl. 119—96)

This invention relates to a protective device for pets, for instance dogs and cats, when the pets are being conveyed in an automobile or other type of motor vehicle.

An object of the invention is to provide a practical, very simple device which is easily installed in a motor vehicle to prevent a cat from jumping from the motor vehicle and experiencing the possibility of becoming injured.

Briefly, the invention is embodied in a holder which is securable to the shelf behind the backrest of the seat in a motor vehicle. A spindle constitutes a part of the device and has a fastener by which to attach the leader or leash to the spindle. The pet, then, has the liberty of movement only to the extent of the length of the leash and is restrained from jumping from the motor vehicle regardless of whether the motor vehicle is in motion or stopped.

Ordinarily, another object of the invention is to provide a mechanically simple, practical device for engaging the leash or leader of a pet while the pet is in the motor vehicle and preventing the pet from jumping from the motor vehicle. It is quite evident that the device will also serve the corollary purpose of preventing the pet from occupying positions in the motor vehicle which may cause the motorist to be distracted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a cross-sectional view taken on the line 1—1 of FIGURE 2 and showing the preferred location for the device in a motor vehicle.

FIGURE 2 is a top plan view, showing a motor vehicle with a device in accordance with the invention installed therein.

FIGURE 3 is a sectional view taken on the line 3—3 of FIGURE 1 and showing in detail the construction of a mounting post.

In the accompanying drawing FIGURE 2 discloses a motor vehicle 10 with the package shelf 12 behind the backrest 14 of seat 16. This is a conventional arrangement. Sometimes motor vehicles have rear loudspeakers in shelf 12, and when such is the case, the device 18 will be mounted over the loud speaker as a protection for the loud speaker.

The device 18 consists of a base panel 20 made of metal, plastic or other suitable material and essentially rectangular in formation. There are four mounting posts 22 attached to the base panel 20 near the corners thereof, and each mounting post is identical. For instance, typical mounting post as shown in FIGURE 3, consists of a bolt 24 passed through an opening 26 in base panel 20 and through a hole 28 in shelf 12. A compressible resilient sleeve 30, for instance rubber, is disposed on the shank of bolt 24 and has the upper end thereof contacting the lower surface of base panel 20. The lower end of the resilient shock mounting sleeve 30 contacts a washer 32 which is placed on the top surface of shelf 12 and through which bolt 24 extends. A nut 34 which may be secured in place from the trunk compartment of the motor vehicle, is attached to bolt 24, while the head 36 and washer contact the top surface of base panel 20.

When fastened in this way, base panel 20 is resiliently mounted in a position on shelf 12 vertically spaced from the top surface thereof. Should the shelf 12 contain a loud speaker, the spacing of the fasteners 22 is such as to position base panel 20 above the speaker for protection of the loud speaker.

Although block 40 may be made integral with base panel 20, for instance, the base panel is constructed of plastic material, FIGURE 1 shows block 40 as a separate element attached thereto by means of nut and bolt assemblies 42. The block 40 has an opening 44 in registry with an opening 46 formed at the center of base panel 20. Spindle or rotary post 48 extends through openings 44 and 46 and is held in place by means of a lower nut and washer 50 and an upper pin 52 and washer 54 contacting the upper and lower surfaces respectively of block 40 and base panel 20. The upper end of the spindle is smoothly curved and contains a distorted S-hook 54 which is held in place by any suitable means, for instance by nut 56. The eye 58 of the hook 54 has a clamp 60 engaged therewith, the clamp being a French clamp and conventional in nature.

The clamp 60 is engaged with a ring 62, and the ring is engaged with the link 64. A leader or leash 66 with which the collar of the pet is connected at one end, has link 64 connected therewith at the hand-grip 68 of the leash. The arrangement of leash 66, clamp 60, ring 62 and eye 58 as well as spindle 48, forms an articulate connection between leash 66 and base panel 20 and the pet.

As shown in FIGURE 2, the length of the leash will determine the distance which the pet may move. This is made sufficiently short to prevent the pet from jumping from the motor vehicle. However, when it is desired to remove the pet from the motor vehicle and maintain the pet under control of the owner, clamp 60 is released so that the entire leash 66 may be removed, leaving the balance of device 18 fastened in place permanently within the motor vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pet restraining device comprising, in combination, a motor vehicle including a seat comprising a backrest and a package shelf in back of said backrest, a base, resilient vibration absorbing means securing said base on said shelf in vertically spaced relation thereto, and a leash having one end connected to said base.

2. A pet restraining device comprising, in combination, a motor vehicle including a seat comprising a backrest and a package shelf in back of said backrest, a base, resilient vibration absorbing means securing said base on said shelf in vertically spaced relation thereto, a post rotatably mounted on said base, and a leash having one end detachably connected to said post.

3. A pet restraining device comprising, in combination, a motor vehicle including a seat comprising a backrest and a package shelf in back of said backrest, a base mounted on said shelf in vertically spaced relation thereto, a post mounted on said base, a leash for connection at one end, to a pet, said leash including a hand loop on its other end, and means detachably connecting said other end of said leash to the post.

4. The combination of claim 3, wherein said post is rotatable in the base and includes an angularly bent upper end portion to which the leash is connected.

References Cited in the file of this patent
UNITED STATES PATENTS

| | | |
|---|---|---|
| 2,129,933 | Hueglin | Sept. 13, 1938 |
| 2,179,268 | Neeson | Nov. 7, 1939 |
| 2,645,922 | Martin | July 21, 1953 |
| 2,790,419 | Sullivan | Apr. 30, 1957 |
| 2,812,743 | Dustin | Nov. 12, 1957 |